(12) United States Patent
Kindaichi et al.

(10) Patent No.: US 6,542,696 B2
(45) Date of Patent: Apr. 1, 2003

(54) DISTANCE MEASUREMENT APPARATUS OF CAMERA

(75) Inventors: Takeshi Kindaichi, Hachioji (JP); Osamu Nonaka, Sagamihara (JP)

(73) Assignee: Olympus Optical Co., Ltd. (JP)

(*) Notice: Subject to any disclaimer, the term of this patent is extended or adjusted under 35 U.S.C. 154(b) by 0 days.

(21) Appl. No.: 10/026,390

(22) Filed: Dec. 24, 2001

(65) Prior Publication Data

US 2002/0102103 A1 Aug. 1, 2002

(30) Foreign Application Priority Data

Jan. 4, 2001 (JP) .................................... 2001-000192

(51) Int. Cl.$^7$ ............................................. G03B 13/34
(52) U.S. Cl. ................................................ 396/123
(58) Field of Search ................................ 396/121–123

(56) References Cited

U.S. PATENT DOCUMENTS 4,943,824 A * 7/1990 Nabeshima et al. ........ 396/123

* cited by examiner

Primary Examiner—W. B. Perkey
(74) Attorney, Agent, or Firm—Straub & Pokotylo; John C. Pokotylo

(57) ABSTRACT

There is disclosed a distance measurement apparatus of a camera which obtains subject distance information (phase difference of a subject luminance signal) of each distance measurement area by a photoelectric conversion element with a plurality of distance measurement areas including a peripheral region outside a region to be photographed arranged therein, divides the distance measurement areas having numeric values in a predetermined range and being adjacent to one another into groups from the obtained subject distance information, excludes the group extending into the region to be photographed, performs distance measurement operation processing of a major subject by a distance measurement result of the group existing only in the region to be photographed, selects a result indicating a closest distance from distance measurement results, and obtains a final distance measurement output.

14 Claims, 4 Drawing Sheets

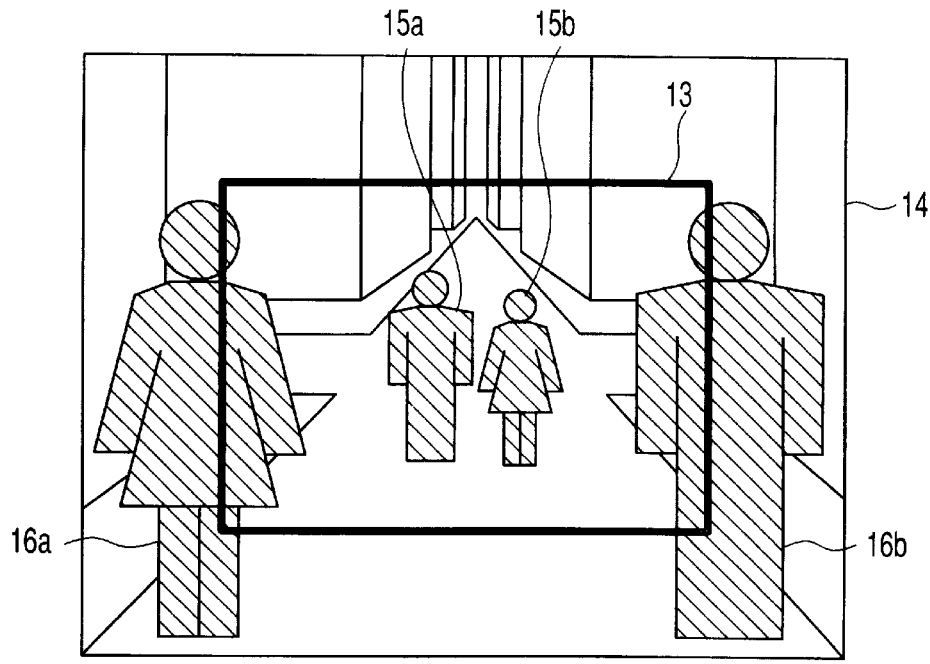
F I G. 5
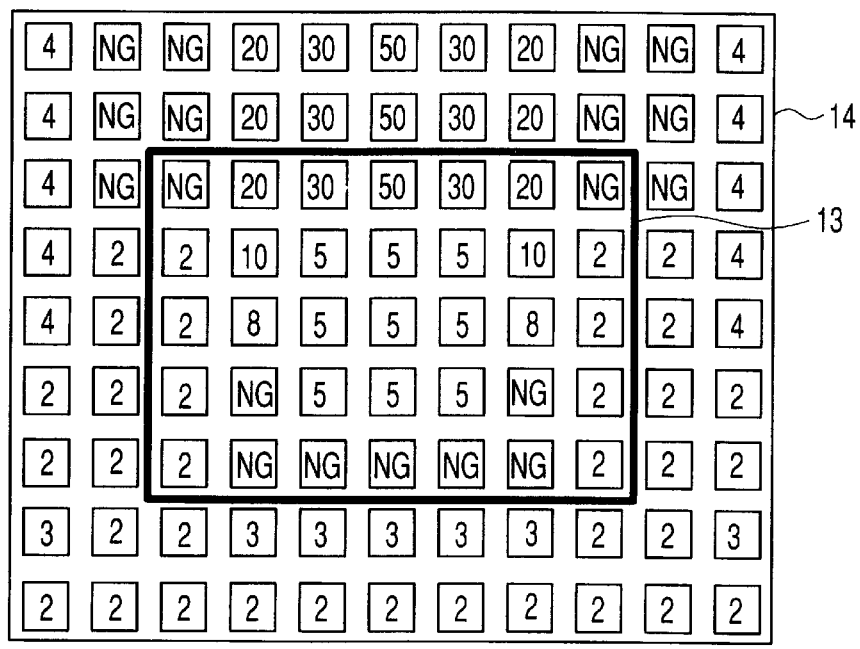
F I G. 6

DISTANCE MEASUREMENT APPARATUS OF CAMERA

CROSS-REFERENCE TO RELATED APPLICATIONS

This application is based upon and claims the benefit of priority from the prior Japanese Patent Application No. 2001-000192, filed Jan. 4, 2001, the entire contents of which are incorporated herein by reference.

BACKGROUND OF THE INVENTION

1. Field of the Invention

The present invention relates to a whole-screen distance measurement apparatus in which a distance measurement area is set also in a peripheral region outside a region to be photographed, particularly to a distance measurement apparatus of a camera in which erroneous distance measurement with respect to miscellaneous subjects (non-major subjects) is eliminated and a major subject is detected exactly.

2. Description of the Related Art

Various techniques concerning a multi-point distance measurement apparatus of a camera have heretofore been proposed. The multi-point distance measurement apparatus has a technique of selecting one or a plurality of results from distance measurement results of a plurality of distance measurement areas disposed in a region to be photographed, and detecting a major subject as a final distance measurement result.

When the number of distance measurement areas increases, it is important to select a distance measurement area with the major subject existing therein from these areas. For detection of the major subject by the conventional proposed techniques, a closest distance selection has been the mainstream in which a subject existing in the vicinity of the camera is regarded as the major subject, and a shortest distance output is selected from obtained distance measurement results of all distance measurement areas. For example, for a souvenir picture when sightseeing, a person as the major subject exists in a position closest to the camera in the region to be photographed. In such a general photography scene, the closest distance selection has been a very effective technique of major subject detection.

However, there are various patterns in the photography scene in accordance with a photographer's intention. When an attempt is made to exactly detect the major subject in any photography scene, many photography scenes cannot be handled by the closest distance selection alone.

To solve the problem, a large number of variously improved techniques of closest distance selection have also been proposed. Techniques such as center-oriented closest distance selection for performing weighting so that priority is given to the center of a photography screen during the closest distance selection are also known.

In a photography scene such as a full-length portrait in which a person is photographed to the vicinity of the feet, ground in the vicinity of the person's feet is closest to the camera, and is judged as an area in which the major subject exists. Therefore, a photograph in which the vicinity of the feet is focused and the person's face is out of focus is taken. On the other hand, when priority is given to the center of the photography screen, the vicinity of the feet can be prevented from being focused to some degree.

When the whole-screen distance measurement apparatus is used, in addition to major subject detection, a technique for excluding miscellaneous subjects (indicating subjects other than the major subject herein) is important. In other words, the major subject cannot appropriately be detected without the technique of excluding the miscellaneous subjects.

However, the conventional proposed techniques do not extend to the technique of excluding the miscellaneous subjects in the whole-screen distance measurement apparatus. That is, in the conventional multi-point distance measurement apparatus, the closest distance selection is performed in various methods, but an optimum major subject is not necessarily detected. As described above, depending upon the photography scene, the problem that the miscellaneous subjects are focused, and the major subject is out of focus is not solved.

BRIEF SUMMARY OF THE INVENTION

An object of the present invention is to provide a distance measurement apparatus of a camera which exactly excludes miscellaneous subjects from a photography scene, and quickly realizes detection of an optimum major subject.

According to the present invention, there is provided a distance measurement apparatus of a camera including: distance measurement means having a plurality of distance measurement areas in a region to be photographed by the camera and a peripheral region of the region to be photographed; classification means for grouping one or more distance measurement areas whose distance measurement outputs in difference between any two adjacent distance measurement areas are in a predetermined range and which are adjacent to one another in the plurality of distance measurement areas into a single distance measurement area group; exclusion means for excluding the distance measurement area which belongs to a group extending over the region to be photographed and the peripheral region among the groups classified by the classification means; and selection means for selecting the distance measurement area indicating a closest distance and selecting the distance measurement output of the selected distance measurement area as a final distance measurement output among the distance measurement outputs of the distance measurement areas which are not excluded by the exclusion means in the region to be photographed.

Furthermore, the distance measurement apparatus of the camera has the following distance measurement steps: a step of performing a distance measurement operation with respect to a plurality of distance measurement areas disposed in a region to be photographed by the camera and a peripheral region of the region to be photographed; a step of dividing distance measurement outputs of the plurality of distance measurement areas into groups; a step of excluding the distance measurement area which belongs to a group extending over the region to be photographed and the peripheral region in the classified groups; and a step of selecting the distance measurement output suitable for predetermined conditions as a final distance measurement output from the distance measurement outputs of the distance measurement areas which are not excluded by the exclusion step in the region to be photographed.

The distance measurement apparatus of the camera constituted as described above obtains subject distance information (or a phase difference of a subject luminance signal) of each distance measurement area by a two-dimensional photoelectric conversion means in which a plurality of distance measurement areas including a peripheral region outside a region to be photographed are disposed, groups the distance measurement areas whose numeric values are in a predetermined range and which are adjacent to one another from the obtained subject distance information, excludes the groups extending into the region to be photographed, performs a distance measurement operation processing of the major subject by the distance measurement results of the groups existing only in the region to be photographed, and selects a shortest distance as the final distance measurement output from the distance measurement results.

BRIEF DESCRIPTION OF THE SEVERAL VIEWS OF THE DRAWING

FIG. 5 is a diagram showing an example of the region to be photographed and the capture region in a photography scene in which a subject exists.

FIG. 6 is a diagram showing distance measurement results of all distance measurement areas based on the photography scene shown in FIG. 5.

DETAILED DESCRIPTION OF THE INVENTION

An embodiment of the present invention will be described hereinafter in detail with reference to the drawings.

Figure 1:
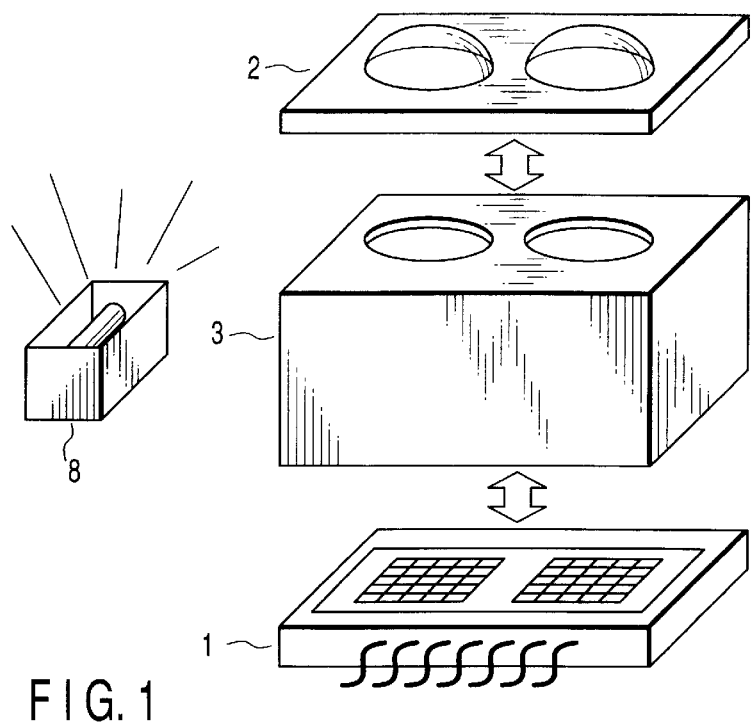
FIG. 1 is a diagram showing a schematic constitution example of a multi-point distance measurement apparatus of a camera according to one embodiment of a distance measurement apparatus of the present invention.

FIG. 1 shows a schematic constitution example of a multi-point distance measurement apparatus of a camera according to one embodiment of a distance measurement apparatus of the present invention.

The distance measurement apparatus is roughly constituted of a distance measurement processor (AFIC 1a and CPU 1c) 1 for photoelectrically converting a received light image and generating distance measurement data, an optical system 2 for forming the light image from the outside (photography scene) into images of two systems (pair), and a shielding case 3 for guiding the pair of formed light images into the distance measurement processor 1. The apparatus further includes a light projecting unit 8 which has a xenon tube for emitting an auxiliary light to a region to be photographed during distance measurement.

Figure 2:
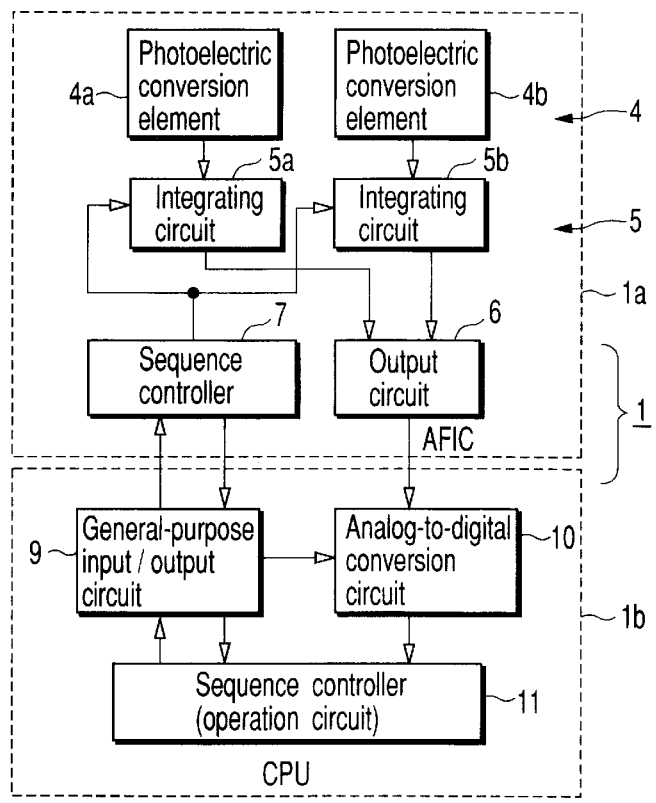
FIG. 2 is a diagram showing an electric block constitution of a distance measurement processor shown in FIG. 1.

FIG. 2 shows an electric block diagram of the distance measurement processor 1. The processor will be concretely described.

The distance measurement processor 1 is constituted of an AFIC1a for generating a luminance information pair by photoelectric conversion, and a CPU 1b for generating the distance measurement data (final distance measurement output) from the luminance information by an operation processing.

The AFIC 1a is constituted of a pair of photoelectric conversion elements 4 (4a, 4b) for receiving the light images of the photography scene, a pair of integrating circuits 5 (5a, 5b) for integrating light currents output from these photoelectric conversion elements 4 and generating the luminance information of the subject, an output circuit 6 for outputting the luminance information of the subject to the outside (e.g., CPU 1b) of the AFIC 1a, and a sequence controller 7 for controlling the integrating circuit 5 and output circuit 6.

Moreover, the CPU 1b is constituted of a general-purpose input/output circuit 9 for controlling the AFIC 1a by communication, an analog-to-digital conversion circuit 10 which functions as an interface for taking in the luminance information of an analog signal output from the AFIC 1a, and a sequence controller (operation circuit) 11 which has an operation function for generating the distance measurement data from the luminance information in accordance with a predetermined program sequence.

In the present embodiment, the subject luminance information of the analog signal is output from the output circuit 6 of the AFIC 1a. Various examples of an output method of the subject luminance information are considered. For example, the analog-to-digital conversion circuit 10 may be incorporated on an AFIC 1a side, and may output the luminance information consist of a digital signal. Moreover, in the present embodiment, the AFIC 1a does not have a function for performing a distance measurement operation, and the distance measurement operation is performed by the CPU 1b. Of course, it is considered that the AFIC 1a may perform the distance measurement operation and also include a function for performing focus adjustment. For fine division of the function of the distance measurement apparatus, various modification examples are considered.

Figure 3:
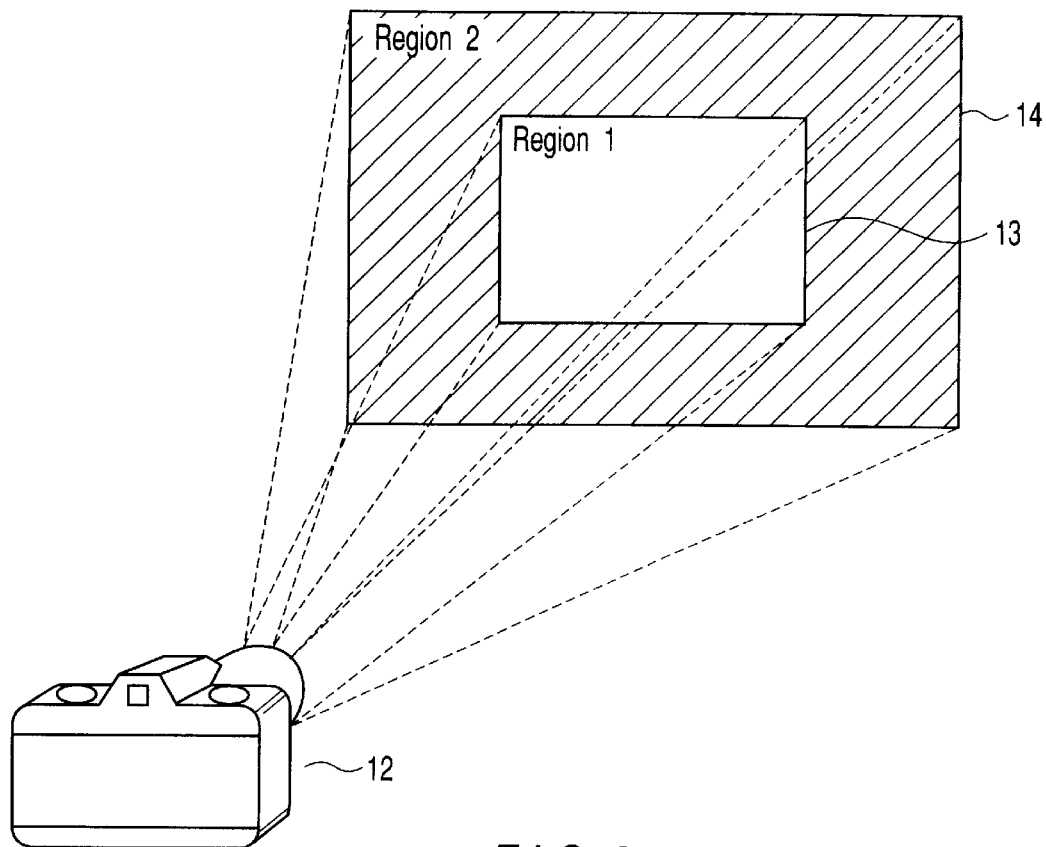
FIG. 3 is a diagram showing a region to be photographed by the camera, and a capture region in which a photoelectric conversion element receives light.

Distance measurement by a camera with the aforementioned distance measurement apparatus mounted thereon will be described with reference to FIG. 3. Here, for the camera, a film camera, a digital camera, or a video camera is considered. Moreover, a distance measurement apparatus of an external light system, or a focus adjustment apparatus of a TTL system may be used. FIG. 3 shows a region to be photographed 13 [region 1] by a camera 12, and a capture region 14 [region 2] in which the photoelectric conversion element 4 of the AFIC 1a captures the light image from the photography scene. The region 2 includes the region 1. In this manner, the distance measurement apparatus of the present embodiment can measure distances in a range extending to a peripheral portion outside the region to be photographed in which the subject exists.

Figure 4:
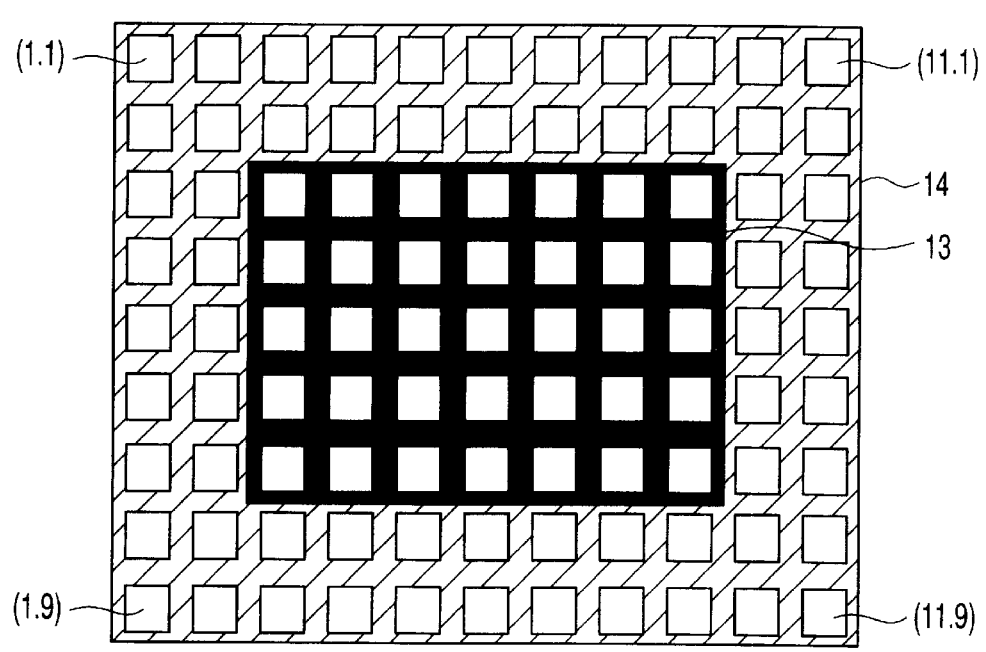
FIG. 4 is a diagram showing an arrangement example of distance measurement areas disposed in the region to be photographed and the capture region.

FIG. 4 shows an example of the aforementioned region to be photographed 13, capture region 14 of the photoelectric conversion element 4 for capturing the light image from the photography scene, and a plurality of distance measurement areas disposed in the capture region 14 (capture region 12). Additionally, arrangement positions of these distance measurement areas and the number of areas are shown as one example, but numerous modification examples are considered. In an arrangement example of the present embodiment, nine areas are arranged in a vertical direction and eleven areas are arranged in a lateral direction so that 9×11=99 distance measurement areas in total are arranged in a matrix form.

Figure 8:
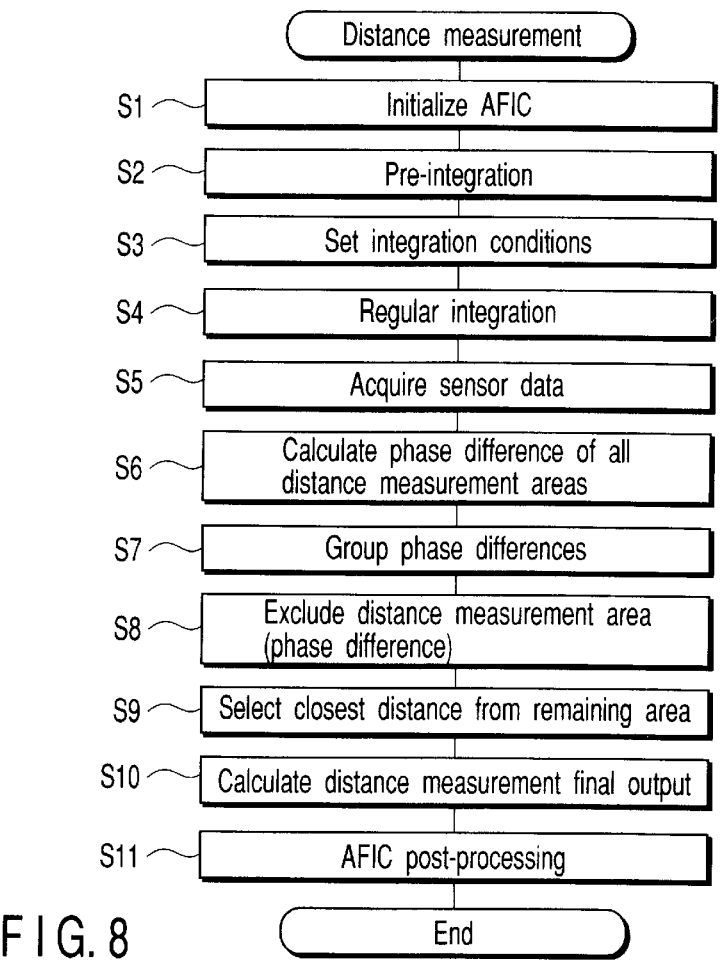
FIG. 8 is a flowchart showing a distance measurement operation by the distance measurement apparatus of the present invention.

The distance measurement by the distance measurement apparatus constituted in this manner will next be described with reference to the photography scene shown in FIG. 5 and a flowchart shown in FIG. 8.

In the photography scene shown in FIG. 5, the aforementioned capture region 14 shows a composition in which buildings are in the background and a plurality of persons exists on the street. Moreover, the region to be photographed 13 in which two persons 15a, 15b in the center of the screen are photographed as major subjects is set in the capture region 14. A part of two persons 16a, 16b who are not the major subjects extends into opposite ends of the region to be photographed 13, that is, over a boundary of the region to be photographed 13 and capture region 14.

First, the CPU 1b resets the sequence controller 7, and initializes the AFIC 1a (step S1). Subsequently, the sequence controller 7 resets the integrating circuit 5 and output circuit 6, and waits for a command for the next operation from the CPU 1b. Moreover, the photoelectric conversion element 4 and integrating circuit 5 perform pre-integration based on the command transmitted to the sequence controller 7 from the CPU 1b (step S2). The pre-integration is performed in order to acquire data concerning the subject, when integration conditions are set in accordance with the subject.

Subsequently, a result of the pre-integration is received, and the integration conditions are set (step S3). Here, the integration conditions include sensitivity of the photoelectric conversion element 4, presence/absence of emission of the auxiliary light from the light projecting unit 8, and the like, and are generally set in accordance with the luminance of the photography scene (or the major subject). Regular integration is executed in accordance with the integration conditions (step S4). In the regular integration for detecting the luminance information of the photography scene, the photoelectric conversion element 4 receives the light from the photography scene, and the integrating circuit 5 integrates the generated light current.

Thereafter, the output circuit 6 of the AFIC 1a outputs sensor data as the luminance information of the photography scene. The sensor data is digitized by the analog-to-digital conversion circuit 10, and temporarily stored in a memory such as RAM (not shown) incorporated in the CPU 1b (step S5). Subsequently, the CPU 1b successively reads the luminance information from the memory, and performs a phase difference operation in all the distance measurement areas (step S6). The phase difference operation is a known technique, and a relative deviation amount of the subject luminance information obtained from the photoelectric conversion element 4 is obtained. The relative deviation amount depends on the subject distance.

FIG. 6 shows the subject distances as measurement results of all the distance measurement areas based on the photography scene of FIG. 5. Since a shown relative deviation amount is not easily understood, the subject distance obtained by post-processing is shown. A numeric value of the subject distance is shown in a unit of (m). Here, "NG" described in the distance measurement area means that distance measurement is impossible.

Selection of miscellaneous and major subjects will next be described.

Figure 7:
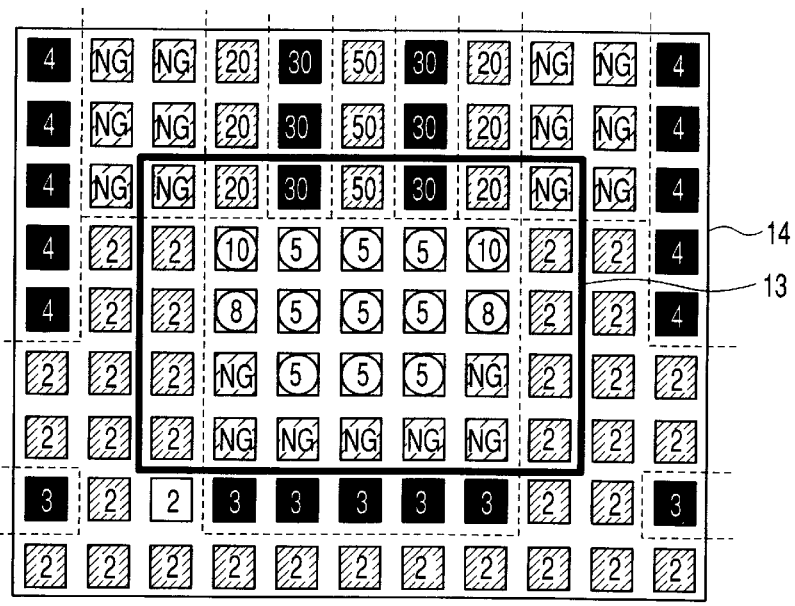
FIG. 7 is a diagram showing a state in which the distance measurement areas are grouped from the distance measurement results of all the distance measurement areas based on the photography scene shown in FIG. 5.

First, as shown in FIG. 7, phase differences in all the distance measurement areas are divided into groups (step S7). In the drawing, a result of grouping is shown by a dotted line. As in FIG. 6, these numeric values do not directly indicate the phase differences, and indicate the subject distances. Here, the subject distance which has a relative relation with the phase difference is used to perform the grouping. There are rules for performing the grouping. First, when the phase differences of the adjacent distance measurement areas are compared, that is, when the subject distances are compared herein, and a result is within a predetermined difference, the areas are judged to belong to the same group. Moreover, secondly, the group is constituted of a group of connected distance measurement areas. It is judged that the distance measurement areas in remote positions, even having equal phase difference (subject distance), cannot belong to the same group.

The grouped distance measurement areas (phase differences, or subject distances) are judged not to be the major subjects based on the predetermined conditions and are excluded from distance measurement operation processing data (step S8). A first exclusion condition is a distance measurement disabled area. Moreover, a second condition is a distance measurement area belonging to the group which exists over the region to be photographed 13 and capture region 14. Additionally, since the distance measurement area disposed in the capture region 14 is originally outside the region to be photographed 13, the area is not reflected in a final distance measurement result.

In FIG. 7, which is based on the photography scene shown in FIG. 5, the distance measurement area not excluded in the region to be photographed 13 is a position with a circled numeric value put therein. Concretely, thirteen positions in total including nine positions each having ⑤ indicating a subject distance of 5 m, two positions each having ⑧ indicating 8 m, and two positions each having ⑩ indicating 10 m are positions in which the major subject is judged to exist.

Subsequently, a closest distance is selected from the non-excluded distance measurement areas (step S9). Here, when the closest distance is selected based on the phase difference, the distance measurement area having a maximum value of phase difference is selected. In an example shown in FIG. 7, an encircled 5 group indicating 5 m in the vicinity of the center of the screen is selected. The phase difference subjected to the closest distance selection is converted to a subject distance or a defocus amount of the subject, and a final distance measurement output is calculated (step S10), and output on the camera side. On the camera side, the final distance measurement output is received, and the camera lens is focused. Thereafter, as post-processing of the AFIC 1b, the power supply is turned off, and the distance measurement sequence is ended.

Additionally, for a selection direction of the major subject, in addition to the closest distance selection in the non-excluded distance measurement area, another major subject selection algorithm may be used in which the subject having a distance closest to a predetermined distance is selected as the major subject.

As described above, in the camera with the distance measurement apparatus of the present embodiment mounted thereon, the subject distance of each distance measurement area is obtained also in the peripheral region outside the region to be photographed. These obtained subject distances are grouped, and the distance measurement result of the group extending into the region to be photographed is excluded from the distance measurement operation processing of the major subject. The subject suitable for the predetermined condition such as a closest subject is selected as the final distance measurement output from the distance measurement results of the distance measurement areas which have not been excluded in the region to be photographed. Thereby, the miscellaneous subjects in the periphery of the region to be photographed are excluded, the optimum major subject can be detected, and quick distance measurement can be realized.

What is claimed is:

1. A distance measurement apparatus of a camera comprising:
   a distance measurement means having a plurality of distance measurement areas in a region to be photographed by the camera and a peripheral region of the region to be photographed;
   a classification means for grouping one or more distance measurement areas whose distance measurement outputs in difference between any two adjacent distance measurement areas are in a predetermined range and which are adjacent to one another in the plurality of distance measurement areas into a single distance measurement area group;
   an exclusion means for excluding the distance measurement area which belongs to a group extending over the region to be photographed and the peripheral region among the groups classified by the classification means; and
   a selection means for selecting the distance measurement area indicating a closest distance and selecting the distance measurement output of the selected distance measurement area as a final distance measurement output from the distance measurement outputs of the distance measurement areas which are not excluded by the exclusion means in the region to be photographed.

2. A distance measurement apparatus of a camera which obtains a pair of subject images by an optical system, and performs a distance measurement operation based on correlation of the pair of subject images, the apparatus comprising:
   a pair of two-dimensional photoelectric conversion elements which photoelectrically converts the pair of subject images, each of which is divided into a plurality of blocks, and in which a distance measurement area is formed for each pair of corresponding blocks;
   an integrating circuit which integrates a light current signal outputted from the photoelectric conversion element, and generates a pair of subject luminance signals for each of the plurality of distance measurement areas;
   an analog-to-digital conversion circuit which converts an integrated output of the integrating circuit to a digital value; and
   an operation circuit which calculates/processes an output of the analog-to-digital conversion circuit, the operation circuit comprising:
      a correlation operation unit which performs a correlation operation of subject luminance data of the distance measurement area;
      a classification unit which groups one or more distance measurement areas having a difference of correlation operation value calculated by the correlation operation unit in a predetermined range and being adjacent to one another into a single distance measurement area group;
      an exclusion unit which excludes the distance measurement area belonging to the group positioned in a boundary of a region to be photographed by a camera and a region outside the region to be photographed among the classified groups; and
      a selection unit which selects the distance measurement area outputting the correlation operation value indicating a closest distance from the distance measurement areas not excluded by the exclusion unit in the region to be photographed by the camera, and outputs the correlation operation value as a final distance measurement value.

3. An apparatus according to claim 2, wherein the pair of two-dimensional photoelectric conversion elements, and the integrating circuit are formed in the same integrated circuit.

4. An apparatus according to claim 2, wherein the analog-to-digital conversion circuit, and the operation circuit are formed in a single CPU in a distance measurement processing unit.

5. An apparatus according to claim 2, wherein the distance measurement areas on the two-dimensional photoelectric conversion element are arranged in a matrix form.

6. A distance measurement apparatus of a camera which obtains a pair of subject images by an optical system, and performs a distance measurement operation based on correlation of the pair of subject images, the apparatus comprising:
   a pair of two-dimensional photoelectric conversion means which photoelectrically convert the pair of subject images, which are divided into a plurality of blocks, and in which a distance measurement area is formed by a unit of each block;
   a correlation operation means for performing a correlation operation of subject luminance data of the distance measurement area;
   a classification means for grouping a correlation operation value calculated by the correlation operation means in accordance with a predetermined condition;
   an exclusion means for excluding the distance measurement area belonging to the group positioned in a boundary of a region to be photographed by the camera and a region outside the region to be photographed among the classified groups; and
   a selection means for selecting a final distance measurement output from the correlation operation values in the distance measurement areas which have not been excluded by the exclusion means in the region to be photographed by the camera.

7. An apparatus according to claim 6, wherein the selection means selects a value suitable for a predetermined condition as a final distance measurement value among the correlation operation values of the distance measurement areas which have not been excluded by the exclusion means in the region to be photographed by the camera.

8. An apparatus according to claim 6, wherein the classification means groups one or more distance measurement areas whose correlation operation values calculated by the correlation operation means are in a predetermined range and which are adjacent to one another as a single distance measurement area group.

9. A distance measurement apparatus of a camera comprising:
   a distance measurement means having a plurality of distance measurement areas in a region to be photographed by the camera and a peripheral region of the region to be photographed;
   a classification means for grouping distance measurement outputs in the plurality of distance measurement areas;
   an exclusion means for excluding the distance measurement area which belongs to a group extending over the region to be photographed and the peripheral region in the groups classified by the classification means; and
   a selection means for selecting the distance measurement output suitable for a predetermined condition as a final distance measurement output from the distance measurement outputs of the distance measurement areas which are not excluded by the exclusion means in the region to be photographed.

10. A distance measurement apparatus of a camera implementing the following distance measurement method:

performing a distance measurement operation with respect to a plurality of distance measurement areas disposed in a region to be photographed by the camera and a peripheral region of the region to be photographed;

dividing distance measurement outputs of the plurality of distance measurement areas into groups;

excluding the distance measurement area which belongs to a group extending over the region to be photographed and the peripheral region among the classified groups; and selecting the distance measurement output suitable for a predetermined condition as a final distance measurement output from the distance measurement outputs of the distance measurement areas which are not excluded by the exclusion in the region to be photographed.

11. A distance measurement apparatus of a camera comprising:

a distance measurement means for measuring distances of a plurality of subjects in a region to be photographed by the camera and a peripheral region of the region to be photographed;

a judgment means for judging the subject extending over the region to be photographed and the peripheral region to be a miscellaneous subject based on an output of the distance measurement means; and a selection means for judging the subject positioned in a closest distance as a major subject among the subjects excluding the miscellaneous subject in the region to be photographed, and selecting a distance measurement output with respect to the major subject as a final value.

12. A distance measurement apparatus of a camera comprising:

a plurality of distance measurement areas set in a range broader than a range of a region to be photographed by the camera;

an operation means for calculating information related with a subject distance for each of the plurality of distance measurement areas;

a classification means for dividing the calculated information related with the subject distance into groups;

an exclusion means for judging the group extending inside and outside the region to be photographed by the camera to be a miscellaneous subject and excluding the group from a distance measurement processing object; and a selection means for selecting a final distance measurement output from the information related with the subject distance which are not excluded in the region to be photographed by the camera.

13. A distance measurement apparatus of a camera comprising:

at least a pair of two-dimensional photoelectric conversion means for obtaining a subject luminance signal;

at least a pair of optical means for guiding a light from a region broader than a photography region of a camera into the two-dimensional photoelectric conversion means;

a phase difference operation means for calculating a phase difference of the subject luminance signal for each of a plurality of distance measurement areas obtained by dividing/setting the two-dimensional photoelectric conversion means into a plurality of blocks;

a phase difference classification means for dividing a plurality of calculated phase differences of the subject luminance signals into groups;

a phase difference exclusion means for excluding the phase difference of the distance measurement area belonging to the phase difference group extending inside and outside the region to be photographed by the camera;

a phase difference selection means for selecting the phase difference corresponding to a closest distance from the phase differences of the distance measurement areas which are not excluded in the region to be photographed by the camera; and a phase difference conversion means for converting the phase difference of the selected distance measurement area to a final distance measurement output.

14. A distance measurement apparatus of a camera comprising:

a photoelectric conversion means including a pair of photoelectric conversion elements for receiving a light of a capture region in which a plurality of distance measurement areas are arranged and which is broader than a region to be photographed by a camera with two divided lights from a photography scene guided thereto by an optical system, and for obtaining two subject luminance signals;

a distance measurement area division means for dividing distance measurement areas whose numeric values are in a predetermined range and which are adjacent to one another into groups based on a phase difference value or a measured distance value by the two subject luminance signals of each distance measurement area obtained by the photoelectric conversion means; and a distance measurement data generation means for selecting one group which exists only in the region to be photographed and which has a closest distance from the groups divided by the distance measurement area division means, and generating distance measurement data based on the closest distance.

* * * * *